G. H. GIBSON.
CONDENSING APPARATUS.
APPLICATION FILED FEB. 19, 1913.
1,143,381.
Patented June 15, 1915.
3 SHEETS—SHEET 1.
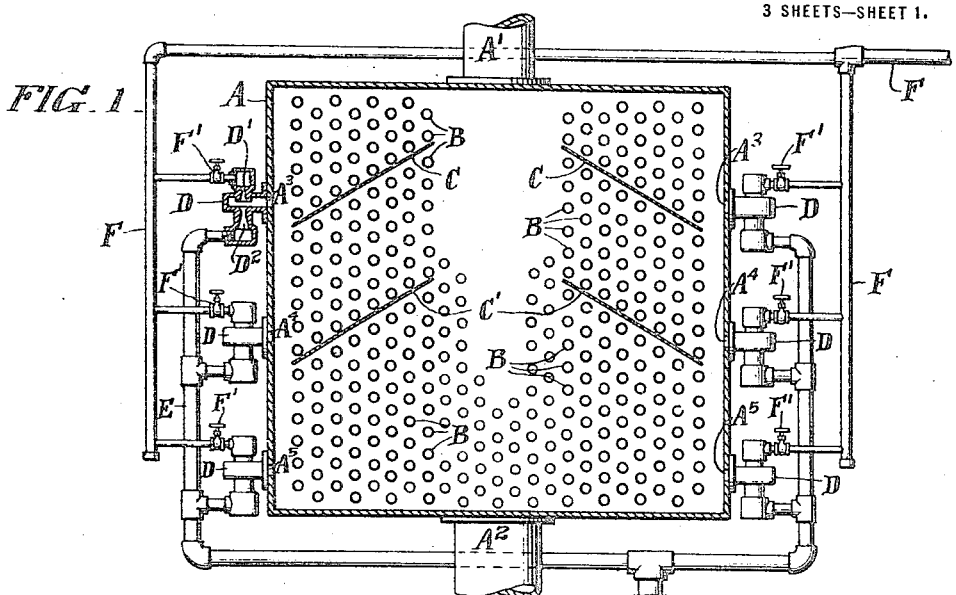
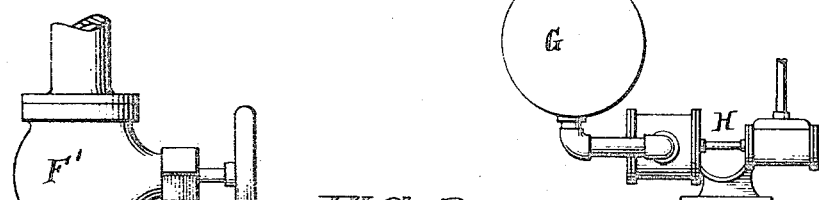
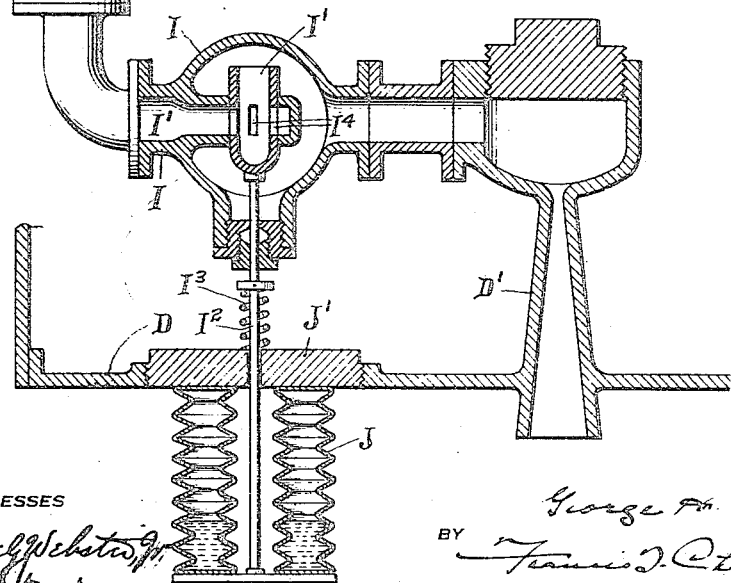
WITNESSES
INVENTOR
George H. Gibson
BY
his ATTORNEY G. H. GIBSON.
CONDENSING APPARATUS.
APPLICATION FILED FEB. 19, 1913.
1,143,381.
Patented June 15, 1915.
3 SHEETS—SHEET 2.
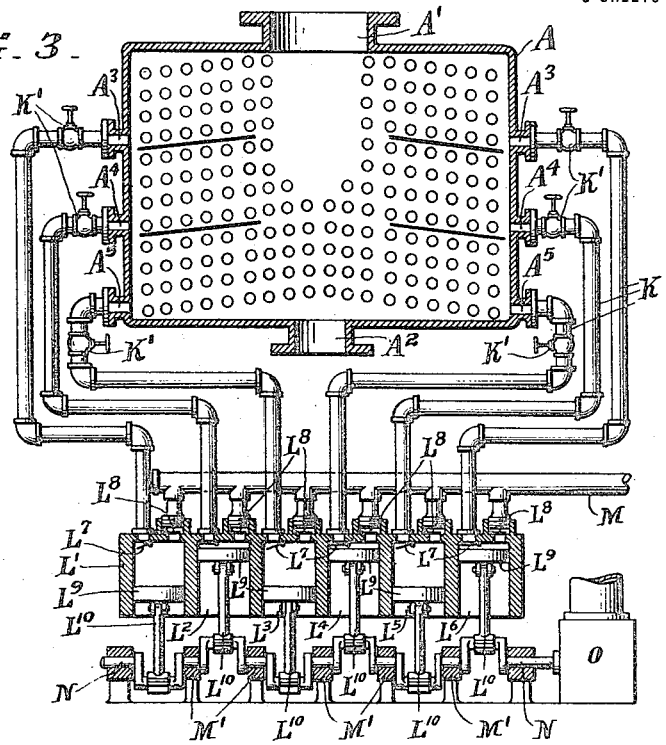
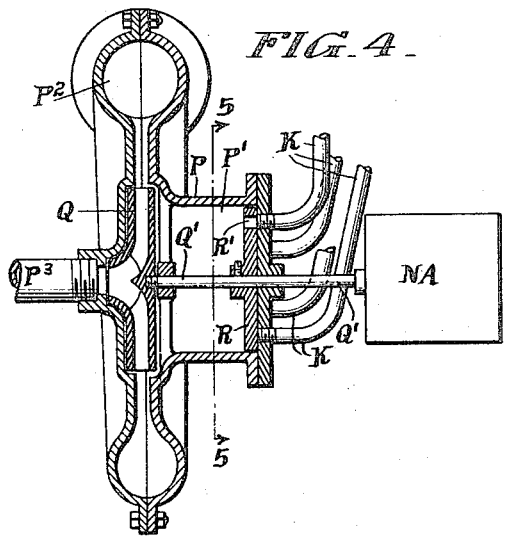
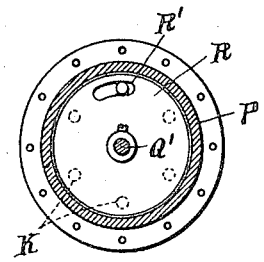
WITNESSES
INVENTOR
George H. Gibson
BY
ATTORNEY

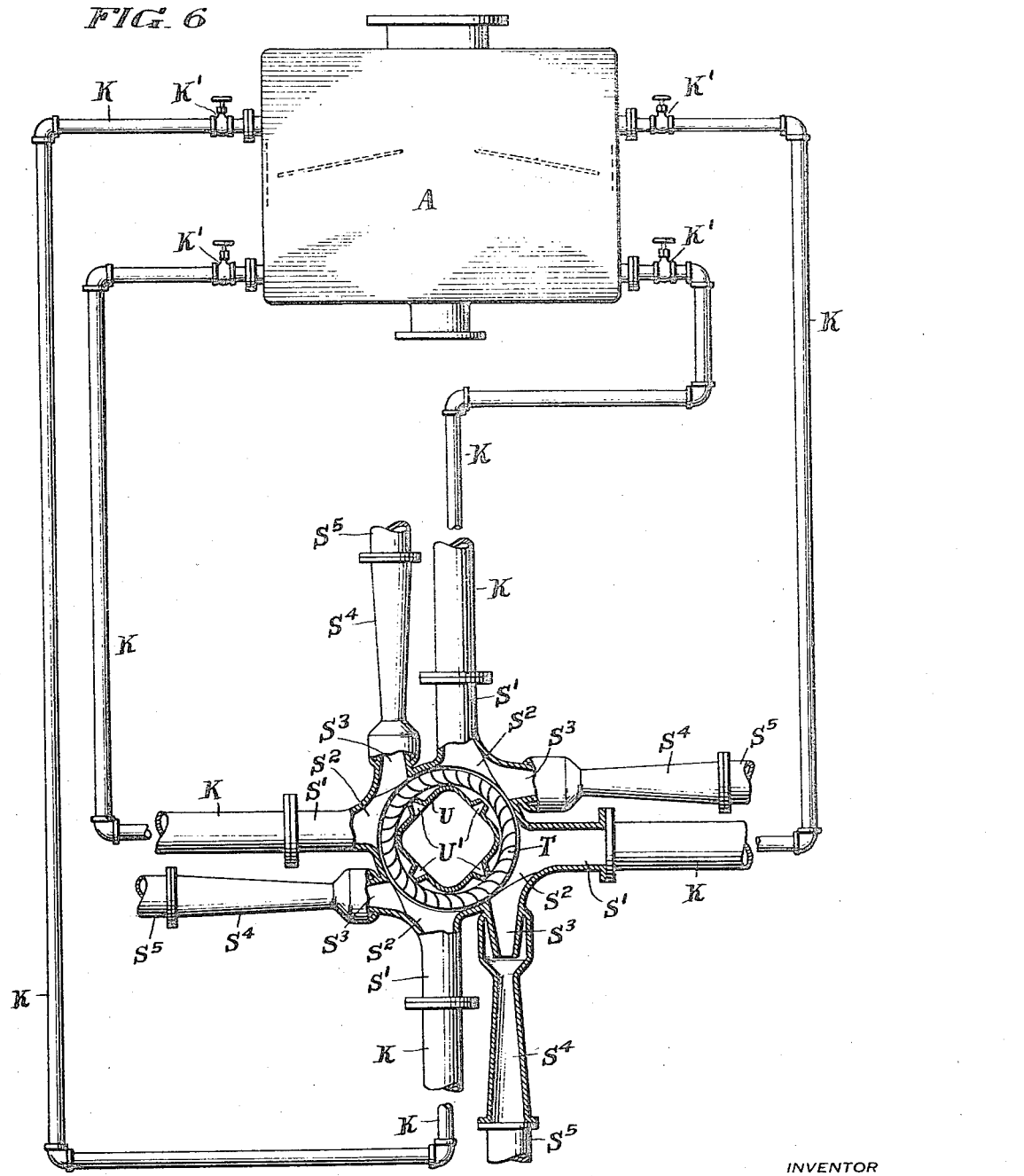

UNITED STATES PATENT OFFICE.

GEORGE H. GIBSON, OF MONTCLAIR, NEW JERSEY, ASSIGNOR TO HIMSELF, AND PAUL A. BANCEL, OF NEW YORK, N. Y.

CONDENSING APPARATUS.

1,143,381.

Specification of Letters Patent.

Patented June 15, 1915.

Application filed February 19, 1913. Serial No. 749,314.

*To all whom it may concern:*

Be it known that I, GEORGE H. GIBSON, a citizen of the United States of America, residing in Montclair, in the county of Essex and State of New Jersey, have invented certain new and useful Improvements in Condensing Apparatus, of which the following is a true and exact description, reference being had to the accompanying drawings, which form a part thereof.

My present invention relates to condensing apparatus of the kind employed for condensing the exhaust steam from engines, turbines and the like, and the primary object of the invention is to improve the operation of such apparatus by providing novel and effective means for withdrawing and disposing of the air tending to accumulate in the main condensing space or spaces into which the steam is passed and is condensed, and by the term "air" as used herein, I mean to include all gases and vapors entering and not readily condensable in the condensing apparatus.

The invention is adapted for use in various types of condensers, but is of a special utility in connection with surface condensers of relatively large capacity.

In carrying out my invention I provide each main condenser unit of the condensing plant with a plurality of distributed outlets for the air entering the condensing space of the main condenser. Advantageously, the entire condensing space may be divided into portions more or less definitely separated by baffles or rain plates, and each having its own air outlet and forming a comparatively simple and direct flow channel leading from the steam inlet to the corresponding air outlet. To insure the proper flow through the different air outlets, I connect each to an individual air moving device or the equivalent thereof. By thus providing for a positive suction at each air outlet I avoid the inequalities in the flow through the various air outlets which occur if the different air outlets are connected by simple branch pipes to the inlet of a single pump or other air moving device. With the last mentioned arrangement more air and steam will ordinarily pass through some air outlets than through others, with the result that air will collect and stagnate in the portion of the condensing space from which the less active air outlets open, while an air-steam mixture unduly rich in steam will pass through the more active air outlets. The equal distribution of steam in and uniform circulation through the condensing space obtained with my improved apparatus are essential to the high efficiency and maximum capacity of the condensing plant.

The different air outlets may be connected in accordance with my invention each to an individual centrifugal or reciprocating pump or pump section or to a jet ejector, or the different air outlets may be intermittently and successively connected to the inlet of a single suitable air pump. In some cases it may be desirable to relatively adjust the suction effects exerted at the different air outlets from time to time either manually or automatically in response to changes in the operating conditions prevailing in different portions of the main condenser.

The air withdrawn from the various air outlets will ordinarily be delivered to suitable auxiliary condensing apparatus in which the steam admixed with the air is condensed, and before or after passing the air into the auxiliary condensing apparatus the air or air-steam mixture is ordinarily compressed up to the pressure of the atmosphere into which it is finally discharged.

The various features of novelty characterizing my invention are pointed out with particularity in the claims annexed to and forming a part of this specification. For a better understanding of the invention, however, and of the advantages possessed by it, reference should be had to the accompanying drawings and descriptive matter, in which I have illustrated and described forms in which my invention may be embodied.

Of the drawings: Figure 1 is a view partly in sectional elevation and partly diagrammatic of condensing apparatus in which the main condenser is of the surface condenser type; and the air moving devices are steam jet ejectors; Fig. 2 is a sectional elevation taken similarly to Fig. 1, but on a larger scale, showing a modification of a portion of the apparatus shown in Fig. 1; Fig. 3 is a view taken similarly to Fig. 1, showing a modification in which the various condenser air outlets are each connected to a corresponding cylinder of a multi-cylinder air pump; Fig. 4 is a side elevation, partly in section, of a rotary wet air pump, having provisions for intermittently and successively connecting its air inlet chamber to different condenser air outlets; Fig. 5 is a section on the line 5—5 of Fig. 4; and Fig. 6 is a diagrammatic representation partly in sectional plan of an arrangement in which the various condenser air outlets are connected to the separate suction inlets of another type of rotary wet air pump.

In Fig. 1 I have shown a main condenser A, having a steam inlet A' at its top, an outlet A² for water of condensation at its bottom, and three air outlets A³, A⁴ and A⁵ at each side of the condenser. Two pairs of inclined baffle or rain plates C and C' are located within the condensing space, the rain plates C extending between the air outlets A³ and A⁴, and the rain plates C' between the air outlets A⁴ and A⁵. These rain plates deflect the water of condensation formed in the spaces above them to the sides of the condenser, and prevent this water of condensation from passing down over such of the condensing tubes B as are located beneath the rain plates. The rain plates, moreover, divide the interior of the condensing chamber into separate compartments or condensing spaces, each opening at its upper end toward the steam inlet and each having one or more air outlets at its bottom. In Fig. 1 individual air moving devices in the form of steam jet ejectors, D, are attached to the different air outlets. As shown, the casings of the ejector device D are attached to the casing of the condenser A, each opening to a corresponding air outlet A³, A⁴ and A⁵. Each ejector comprises an expanding nozzle D' and a compression nozzle D² which are separated from each other by a space through which the air and steam mixture issuing from the air outlet may be sucked into the compressing nozzle D². The compression nozzles of the various ejectors are connected by piping E to the auxiliary condensing and vacuum creating apparatus. This apparatus, in the form shown, comprises a small auxiliary surface condenser G, and an air pump H. Steam from any suitable source, which as hereinafter explained may be at a comparatively low pressure, is supplied to the various ejectors through the piping F, the supply connection to each ejector being separately regulable by an individual regulating valve F'.

In operation, each ejector D, when supplied with steam at a suitable pressure, operates to maintain a pressure at the outlet of the nozzle D² and hence in the piping E above that in the corresponding air outlet. Steam should be so supplied to each ejector that the air will be withdrawn from the corresponding air outlet at a rate which is rapid enough to prevent the accumulation within the portion of the main condensing space adjacent the air outlet of a mixture of air and steam rich in air and slow enough to prevent the withdrawal of a mixture unduly rich in steam. In general, for any given pressure maintained in the condensing space of the main condenser, the quality of the mixture of steam and air issuing from the air outlet will be indicated by its temperature. This temperature will diminish from the theoretical maximum of the temperature of steam at the pressure within the condenser as the percentage of air in the mixture increases. In consequence, the temperatures prevailing at the various air outlets of the main condenser form an indication of the manner in which the steam is distributed and circulated through the condensing space of the main condenser. When the temperatures at the various outlets are all the same, this indicates the desired uniformity in steam distribution and circulation in the condensing space, and when the temperature at one air outlet becomes higher than that at another, this indicates that the portion adjacent to the outlet at the lower temperature is air bound and is receiving less than its proper amount of steam. To correct this condition, the ejectors should be regulated by increasing the relative amount of steam supplied to the ejector at the air outlet of lower temperature.

The adjustment of the steam supply to the various ejectors may be accomplished manually by the attendant, who should test the temperatures prevailing at the various air outlets from time to time. This regulation may also be effected automatically as by means of a thermostat located adjacent each air outlet. One construction for accomplishing this is shown in Fig. 2 where a thermostatically controlled valve I is interposed between the steam inlet of each ejector and the manually controlled supply valve F' therefor. As shown in Fig. 2, the valve I comprises a movable valve member I' of the hollow piston type, which has its stem I² connected to a thermostat J of the expansive bellows type. In this type of thermostat, as is well known, the fluid pressure within the expansive bellows is a function of the temperature therein, and the bellows tends to contract and expand as the fluid pressure within the bellows decreases and increases relative to the fluid pressure to which the bellows is externally subjected. The thermostat J is located in the ejector casing D and is carried by a block J' threaded into an aperture formed for the purpose in the casing D. A spring I³ exerts a force supplementing the effect of the external fluid pressure on the thermostatic bellows in tending to contract the latter and thereby to move the valve member I' into the position in which its ports I⁴ connect the inlet and outlet chambers of the casing of the valve I. Assuming a constant fluid pressure to which the bellows of the thermostat is externally exposed, the thermostatic bellows J is adapted to move the valve member I' into the position in which the supply of steam to the ejector is cut off as the temperature in the corresponding air outlet increases above the temperature fixed by the adjustment of the apparatus, which is determined of course by the conditions of operation. By locating the ejectors D immediately adjacent the air outlets of the main condenser, I avoid the necessity for moving the air and steam mixture withdrawn from the main condensing space through any appreciable length of piping in the highly attenuated condition in which it passes out of this space. The increased pressure imparted to the air and steam mixture by the ejectors need be but slight to materially reduce the required capacity of the vacuum pump and auxiliary condenser, and but a comparatively small amount of steam is required for the operation of the ejectors. Furthermore, this steam need not be supplied at high pressure; indeed, it may be supplied at a pressure appreciably below that of the atmosphere. This makes it possible to employ exhaust steam from auxiliaries, or in the case of a turbine exhausting into the main condensing space, the steam for the ejectors may well be bled from the turbine, taken at some point at which the pressure is slightly above the pressure in the main exhaust steam outlet of the turbine.

In the modified form of apparatus shown in Fig. 3, the main condenser A¹ may be identical with that shown in Fig. 1. The different air outlets of the condenser are connected each by a pipe K to a corresponding one of the cylinders $L'$, $L^2$, $L^3$, $L^4$, $L^5$ and $L^6$ of a multi-cylinder air pump. Each of the pump cylinders is provided with an inlet valve $L^7$ which opens on the suction stroke and closes on the compression stroke of the piston, and with an outlet valve $L^8$ which closes on the suction stroke and opens on the compression stroke of the pump. As shown, the outlet valves $L^8$ open into piping M which may run to suitable auxiliary condensing apparatus (not shown). The pistons $L^9$ working in the various cylinders are each connected by a corresponding connecting rod $L^{10}$ to a common crank shaft N journaled in the bearings M' and rotated by a suitable driving motor O. It will readily be apparent without further explanation that each of the different pump cylinders forms a device for withdrawing air through the air outlet of the condenser to which it is connected, which is not affected in its operation by the volume of air being withdrawn through any of the other air outlets of the condenser. Preferably, as shown, each pipe K is provided with an individual controlling valve K'.

It will be obvious that the multi-cylinder air pump shown in Fig. 3 might be replaced by a plurality of pumps each comprising a single cylinder and connected to a single air outlet of the condenser.

In the modification shown in Figs. 4 and 5, I show a wet air pump P of known type in which air is carried out of the air inlet chamber P' of the pump and into a diffusion chamber $P^2$ by means of jets of water discharged into the diffusion chamber by a centrifugal impeller Q. $P^3$ represents the conduit supplying hurling water to the impeller Q. The shaft Q' carrying the impeller Q is shown as connected to and rotated by a motor NA. The shaft Q' carries a disk R formed with an aperture or port R'. The disk R fits against the inner end wall of the chamber O' and serves as a valve for intermittently connecting a plurality of pipes K to the chamber O' one after another, as the port R' successively crosses the ends of the pipes. The pipes K may be connected to the different air outlets of a condenser, as in Fig. 3. In this arrangement it will be apparent that a positive suction is exerted on each of the different air outlets of the condenser to which the pump is connected once during each revolution of the shaft Q', and that the air discharge through each air outlet of the condenser thus insured will not be affected by the volume of flow occurring through any of the other air outlets.

In the modification shown in Fig. 6, the various pipes K, from the different air outlet openings of the condenser A, each lead to a corresponding suction inlet S' of a rotary wet air pump S. The casing of the pump S shown is formed with a chamber for a rotary impeller T. The impeller chamber opens externally of the impeller into a plurality (four as shown) of pockets $S^2$, into each of which one of said air inlets S' opens. Leading from each of said pockets $S^2$ is a combining nozzle $S^3$, and each combining nozzle discharges into a corresponding diffusion nozzle $S^4$, connected at its outer end to a corresponding discharge pipe $S^5$. Within the impeller T is located a water chamber U formed with discharge nozzles or orifices U' through which jets of water are discharged against the inner edges of the blades of the impeller T, one in line with each chamber or pocket $S^2$. Each jet of water thus directed against the inner edges of the impeller blades is divided by the latter into blade-like jets which are discharged into the corresponding pocket $S^2$ with increased velocity and in such direction that the separate blade-like jets pass into the combining nozzle $S^3$ and carry with them the air and steam entering the corresponding pocket $S^2$ through its suction inlet S' and connected pipe K. The steam is condensed in normal operation in the chamber S² or nozzle S³ and in the diffusion nozzle S⁴ the jet of water and air leaving the registering combining nozzle S³ with high velocity and at low pressure has its energy of velocity largely converted into energy of pressure. The pressure thus created at the discharge ends of the duffusion nozzles S⁴ is sufficient to permit the discharge of air and water against the pressure prevailing at the discharge ends of the pipes S⁵ which will ordinarily be that of the atmosphere.

In my co-pending application, Serial No. 665,706, filed December 14, 1911, I have disclosed and claimed condensing apparatus in which a plurality of air outlets from a main condenser are regulated by dampers, which are opened and closed to regulate the outflow of air and steam through the various air outlets to the vacuum producing and auxiliary condensing apparatus. The apparatus disclosed herein, while embodying general features claimed in said prior application, possesses an important advantage over that disclosed by said prior application from the fact that in the present case the flow regulating devices raise the pressure in the auxiliary apparatus above that in the main condenser, while with the apparatus shown by my earlier invention, the throttling action of the regulating dampers tends to make the pressure in the auxiliary apparatus lower than the vacuum maintained in the main condenser. In consequence, the apparatus disclosed herein permits me to obtain the desired regulation of steam flow and distribution in the main condenser with the aid of auxiliary condensing and vacuum creating apparatus of smaller capacity and higher efficiency than is required with the regulating provisions shown by my earlier application. Moreover, the character of the regulating means which I have now devised, permit of their adjustment by means less complicated and delicate than I consider necessary or at least desirable with the throttling regulators disclosed in my earlier application. It is to be understood, however, that the temperature controlling provisions described in my earlier application, may well be employed to control the operation of such air moving devices as are shown in Fig. 1; for instance, where a highly accurate and delicate adjustment of the operation of the condenser is desired.

While in accordance with the provisions of the statutes, I have illustrated and described the best forms of my invention now known to me, it will be apparent to those skilled in the art that changes may be made in the form of apparatus disclosed herewith, without departing from the spirit of my invention, and that certain features of my invention may well be used in some cases without a corresponding use of other features.

Having now described my invention, what I claim as new and desire to secure by Letters Patent, is:

1. In combination, a condenser having the usual outlet for water of condensation and having in addition thereto a plurality of air outlets, and means for exerting a suction on each air outlet which is independent of the volume of flow through any other of said air outlets.

2. In combination, a condenser having the usual outlet for water of condensation and having in addition thereto a plurality of air outlets and separate air moving means for and connected to each of said air outlets.

3. In combination, a surface condenser having the usual outlet for water of condensation and having in addition thereto a plurality of condensing spaces receiving steam from a common steam inlet and a plurality of independent air outlets, and means for exerting a suction on each air outlet which is independent of the volume of flow through any other of said air outlets.

4. In combination, a condenser having the usual outlet for water of condensation and having in addition thereto a plurality of air outlets, and a separate jet ejector device connected to each of said air outlets.

5. In combination, a main condenser having the usual outlet for water of condensation and having in addition thereto a plurality of air outlets, auxiliary condensing and vacuum producing means to which said air outlets are connected, and a steam ejector located at each air outlet and adapted to suck air out of the main condenser through said air outlet and deliver it at a higher pressure to said apparatus.

6. In combination, a main condenser having a plurality of air outlets, auxiliary condensing and vacuum producing means to which said air outlets are connected, a steam ejector located at each air outlet and adapted to suck air out of the main condenser through said air outlet and deliver it at a higher pressure to said apparatus, and means for automatically regulating the supply of steam to the different ejectors in response to variations in the temperature conditions prevailing in different portions of the condenser.

7. In combination, a main condenser having a plurality of air outlets, auxiliary condensing and vacuum producing means to which said air outlets are connected, a steam ejector located at each air outlet and adapted to suck air out of the main condenser through said air outlet and deliver it at a higher pressure to said apparatus, and means for automatically regulating the supply of steam to the different ejectors in response to variations in temperature conditions prevailing in different portions of the condenser, said means comprising a steam supply valve for each ejector and thermostatic actuating means therefor responsive to the temperature prevailing in the corresponding air outlet.

8. The combination with a condenser having a plurality of air outlets, of means for automatically regulating the discharge through each outlet consisting of a thermostat for each outlet comprising an expansion chamber containing a volatile liquid and subjected to the temperature, and externally exposed to the pressure prevailing in the condenser adjacent said outlet, said expansion chamber being free to contract and expand and thereby acting to increase and decrease the discharge through said outlet as the pressure within the expansion chamber decreases and increases relative to the pressure within the condenser adjacent said air outlet.

GEORGE H. GIBSON.

Witnesses:
PAUL A. BANCEL,
EUGENE G. LARKIN.